Aug. 4, 1964

C. R. TURNER ETAL

3,143,086

IRONING TABLE

Filed Aug. 25, 1960

INVENTORS:
CHARLES R. TURNER
JOHN H. HILLDALE JR.
BY
Howson & Howson
ATTYS.

Aug. 4, 1964  C. R. TURNER ETAL  3,143,086
IRONING TABLE

Filed Aug. 25, 1960  7 Sheets-Sheet 7

INVENTORS:
CHARLES R. TURNER
JOHN H. HILLDALE JR.
BY Howson & Howson
ATTYS.

United States Patent Office 3,143,086
Patented Aug. 4, 1964

3,143,086
IRONING TABLE
Charles R. Turner and John H. Hilldale, Jr., Philadelphia,
Pa., assignors to The Proctor-Silex Corporation, Philadelphia, Pa., a corporation of Delaware
Filed Aug. 25, 1960, Ser. No. 51,853
11 Claims. (Cl. 108—81)

This invention relates to ironing tables and more particularly to tables of conventional dimensions used for hand ironing which have attached collapsible leg structures which enable the tables to be folded flat for storage.

Convenience in storage and the need for ease in handling have limited the maximum dimensions of ironing tables, including the dimensions of the top. In ironing relatively large, flat articles, such as sheets and the like, it is desirable to have a relatively long, substantially rectangular, table top over which the articles can be progressively moved as they are ironed. On the other hand, when ironing irregular or tubular articles, it is desirable to have a relatively small tapered end over which the articles can be fitted. To partially meet these requirements within the limited dimensions of a single table it has been the usual practice to provide a table top of substantial width dictated by the reach of the user with a taper at one end. However, the presence of the tapered end limits the length of the top that is of full width, thus limiting its usefulness for the longer articles since they can be handled satisfactorily only on the portion that has parallel sides. The arrangement is therefore a compromise rather than a complete solution of the problem.

It has been proposed to provide a table top of substantially rectangular shape having a portion of one end attached in such manner as to be movable under the top, when desired, to form a tapered extension similar to that arranged at one end of the more conventional table tops described above. For tables, the tops of which are supported in the preferred manner by cross legs with provision for height adjustment and collapse for storage, there is a limited length of top beyond the nearest supporting leg available to accommodate the extension when it is stored beneath the table. This lack of space effectively limits the acuteness of the angle of the tapered section and therefore limits its usefulness. For this reason, it has been proposed to abandon the desirable leg structure with the attendant advantages of height adjustment, and to support the table top in cantilever fashion from the far end. This again is a compromise.

For storage and other reasons it has been usual to limit the maximum width of the ironing table tops to approximately 15 inches. However, there are some articles of such proportion that a wider table top would materially facilitate their ironing if greater width could be provided when needed.

An object of the present invention is to provide an improved ironing table having a rectangular top surface which can be conveniently altered to include a tapered end when desired, the top surface being supported by attached legs with provision for height adjustment and for collapse for storage.

Another object of the invention is to provide an ironing table of the above kind in which a corner portion of the top surface is hinged to the remainder, movable from an extended position in the plane of the remainder to a folded position beneath the remainder.

A further object of the invention is to provide an ironing table of the above type wherein the table top is sufficiently narrow to permit an acute angle for the corner portion, and with additional means for conveniently increasing the width of the top when desired.

A further object of the invention is to provide a cover which is snug fitting in all positions of ironing table extensions.

Other objects and features of the invention will be apparent from the following description with reference to the accompanying drawings in which.

In its more general aspects, the ironing table of the present invention embodies features of design and construction which have become familiar during recent years through widespread adoption of so-called sit-down ironing. The basic structural elements of ironing tables useful for comfortable sit-down ironing were described and claimed by Harvey E. Hortman, Jr., in U.S. Patent No. 2,896,347.

Figure 1:
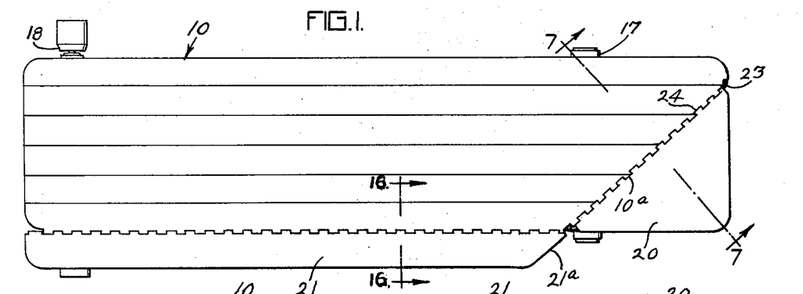
FIG. 1 is a plan view from above of the ironing table showing both leaves extended.
Figure 2:
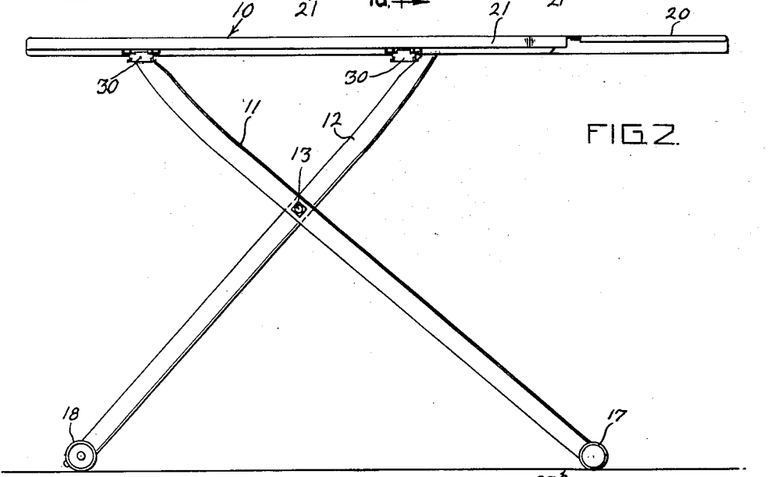
FIG. 2 is a side elevational view of the ironing table of FIG. 1 in position for use.
Figure 3:
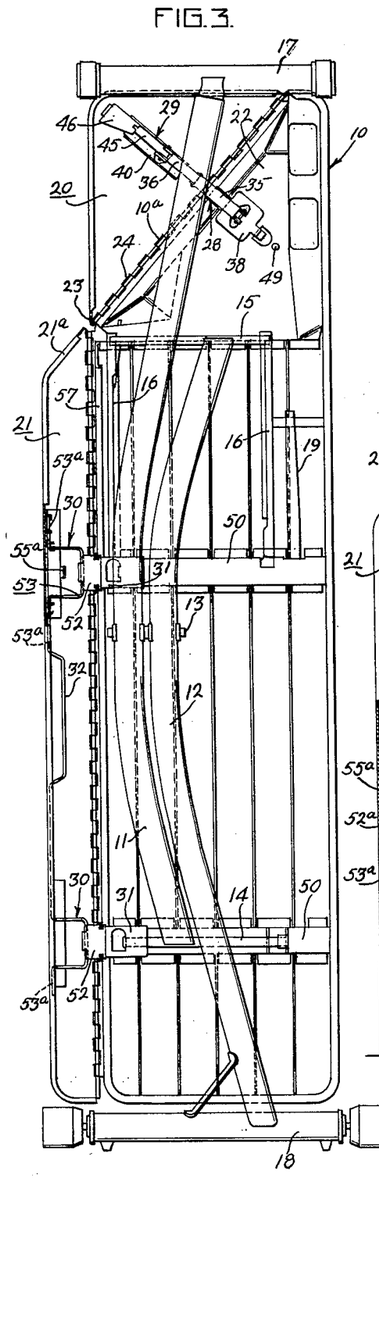
FIG. 3 is a bottom view of the ironing table of FIGS. 1 and 2, with the legs collapsed against the table top for storage but with the leaves in extended position.

Referring first to FIGS. 1, 2 and 3, the table top 10 is supported by a pair of legs 11 and 12 in an X-frame arrangement wherein they are pivotally interconnected by pin 13 and each is separately connected to the table top through pins 14 and 15 (see FIG. 3). These pins extend transversely of the table top and are longitudinally spaced from one another. Pin 14 pivotally connects leg 11 to table top 10 through a fixed support bracket. Pin 15, on the other hand, is mounted for relative movement toward and away from pin 14 while maintaining its parallelism by the provision of suitable track or guide means 16 on the bottom of the table top. Pin 15 moves from the position shown in FIG. 3 in its tracks toward pivot 14 in order to erect the ironing table for work as shown in FIG. 2. In this position, the table is supported on transverse feet 17 and 18 which give lateral support to the table 10. Pin 15 is held in the position selected by a latch (not shown) which is released by a suitable handle 19 and which may be made effective by return of a mechanical latch under spring action upon release of the handle, or by other means such as the effect of gravity incident to tilting of the table as illustrated and described in U.S. Patent No. 2,748,512 to F. W. Kulicke, Jr.

As may be seen in FIG. 3, the legs which are preferably offset beyond the center line of the table top opposite the normal location of the knees of a person seated and using the table for sit-down ironing. In the embodiment shown, each of the legs extends inwardly as it extends upwardly from a portion of maximum offset at the pivotal connection 13 to its pivotal connection with the table top and inwardly and downwardly to its transverse foot portion. Preferably the lower ends of the legs are closely adjacent the center line of the table to provide optimum stability and rigidity.

It will be clear to those skilled in the art that the leg structure, whether of the preferred illustrated X-frame construction or another collapsible type permanently attached to the top, will occupy a considerable portion along the bottom of the table top so that limited space is available beneath the top for storage of table top extensions of any type. In accordance with the present invention, however, extensions are provided which enable the user to select a table having parallel sides throughout its length, a table having a tapered end portion, or a table having an extended width for ironing small flat articles.

Figure 4:
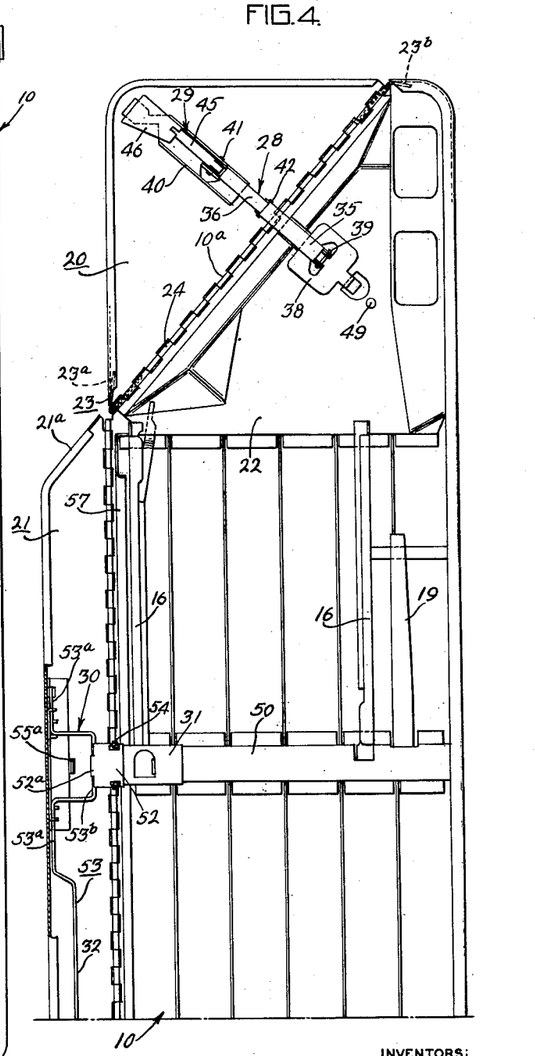
FIG. 4 is an enlarged view of part of the structure shown in FIG. 3 with the leg structure removed.
Figure 5:
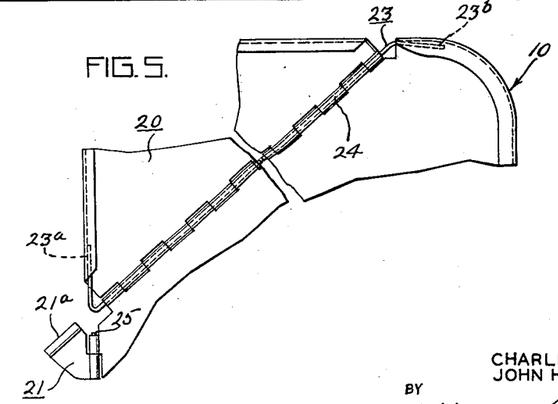
FIG. 5 is an enlarged detail view of the hinge area of one leaf as viewed from beneath the ironing table top.

Although the extension leaves are both shown extended in FIGS. 1, 3, and 4, it will be understood that in most instances these extension leaves will be used alternatively. Extension 20, for example, enables table top 10 which has parallel sides up to the point of taper, from which one side tapers into convergence with the other, to be converted into a rectangular table top having parallel sides throughout its length. Alternatively, leaf 21 may be used to extend the table top 10 laterally in order to give greater width to the table top when desired without adding to the width of the table which must be handled and stored. Extension leaf 21 is provided with a tapered edge 21a which continues the tapered edge 10a of table top 10.

In the case of each of the extension leaves, attachment is made by hinge, the hinge being of the form of a piano hinge but formed directly in sheet metal of the top 10 and the extension leaf 20 or 21, as the case may be. In the case of the hinge connecting leaf 20 to table top 10 it is not the sheet metal itself which forms the hinge in the embodiment shown but a sheet metal stiffening deck 22 at the tapered end of the table. The hinges formed in the edges of these pieces characteristically have successive short tubular pin-receiving portions with spaces between these portions into which fit similar portions on the other hinge piece. These tubular pieces when aligned receive a suitable hinge pin. The tubular portions are preferably formed tangent to the plane of the top surface of the table top 10 and so arranged that a smooth top surface is presented whether the leaf is extended or folded into storage position along a straight edge. The hinge pin 23 of hinge 24 between extension leaf 20 and top 10 serves the dual function of torsion spring urging leaf 20 to rotate downwardly beneath the table top. This is accomplished by affixing end 23a beneath a folded-back edge of member 20 and end 23b beneath the folded-back edge of table top 10 after the pin 23 is twisted. The edges are normally folded back or rolled over in this manner to present a smooth handling edge and to prevent cutting of the user.

Figures 11, 12:
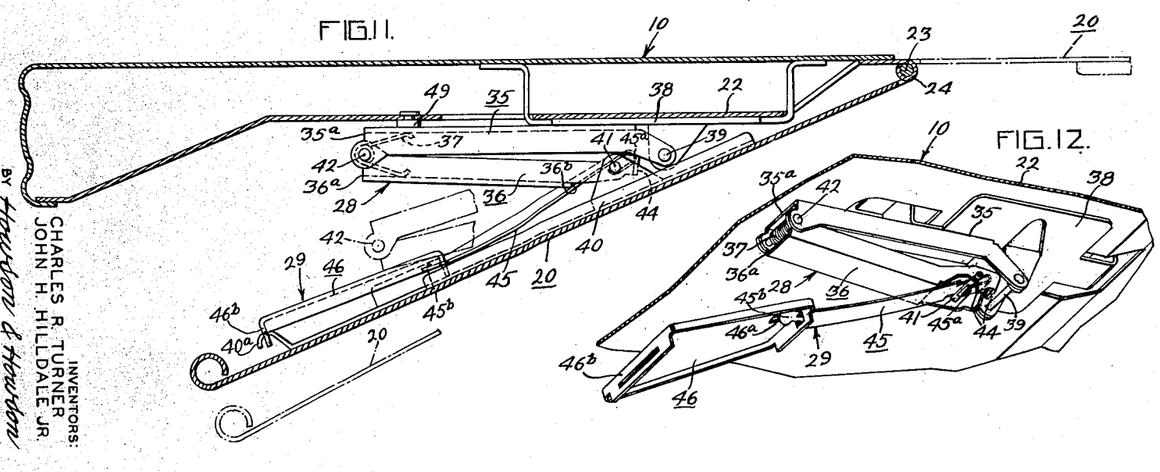
FIG. 11 is a sectional view similar to FIG. 7 showing the leaf lowered to storage position after it has passed over center.
FIG. 12 is a perspective view of the support and release structure in storage position with the leaf removed.

It will be observed that the extension leaf 20 is able to be raised or extended into the position shown in FIGS. 3 and 4 or folded beneath the table as shown in FIG. 11 and it is of advantage that the leaf be foldable beneath the table into the position shown in FIG. 11. The leaf 20 is preferably placed at the end of the table top adjacent which the sliding pivot 15 is positioned since in all operating positions that leg is somewhat retracted and long tubular articles can therefore be pulled over the tapered end to a greater extent depending on leg position than would be possible should the fixed pivot be positioned there. Also, preferably the edge selected for taper, since only one edge is tapered in this preferred embodiment, should be the one on the opposite side of the table from the position of the user. This arrangement makes the tapered end much more accessible to the user. It is, in fact, much more accessible than conventional ironing tables wherein both sides are tapered to the center of the top. The advantage of the arrangement shown is of particular benefit to sit-down ironing wherein it affords the additional benefit of bringing closer to the user the long dimension of the table top.

Referring to FIGS. 3 and 4, it will be seen that in order for leaf 20 to be held in the plane of the top 10, a support structure generally designated 28 is required extending between the top, or more precisely the stiffening deck 22, and the extension leaf 20. In order to release the leaf from its extended position, a release mechanism generally designated 29 is employed. Similarly, to support leaf 21 in the plane of top 10, a support structure is required between the table top 10 and the leaf 21. Actually here two identically support structures 30 are employed connected between the outer edge of the extension leaf 21 and a bracket 31 extending below the table top but constituting an integral part of the table top. In each case, the support member serves to hold the extension leaf in the plane of the table top so that the plane of the ironing surface of the extension leaf corresponds to the plane of the ironing surface of the table top and provides a smooth continuous surface in which the ironer cannot find discontinuities.

Figures 6, 10, 15:
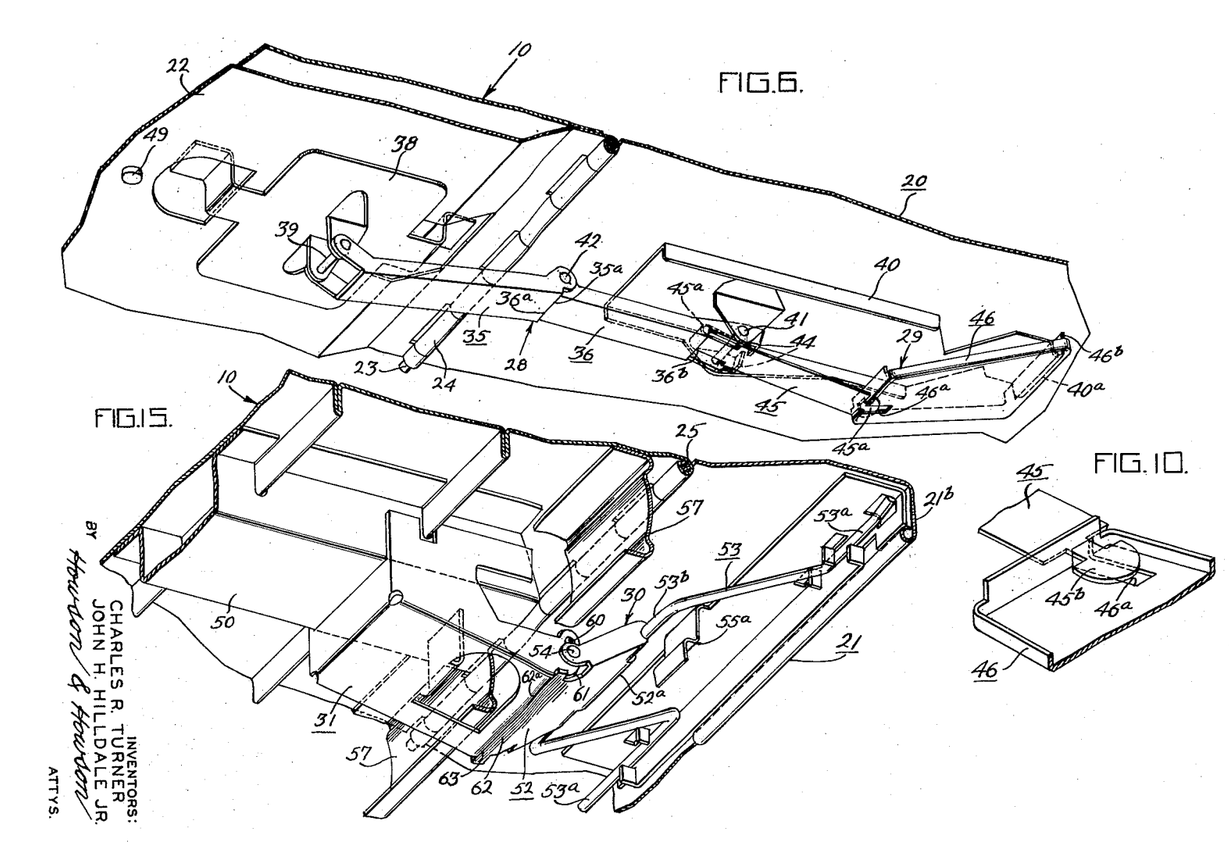
FIG. 6 is a perspective view from below of the support element for the corner leaf.
FIG. 10 is a detail view showing the assembly of the structure of FIG. 9.
FIG. 15 is a perspective view of a portion of the underside of the board in the region of one of the supports for the edge extension leaf.
Figures 7, 8, 9:
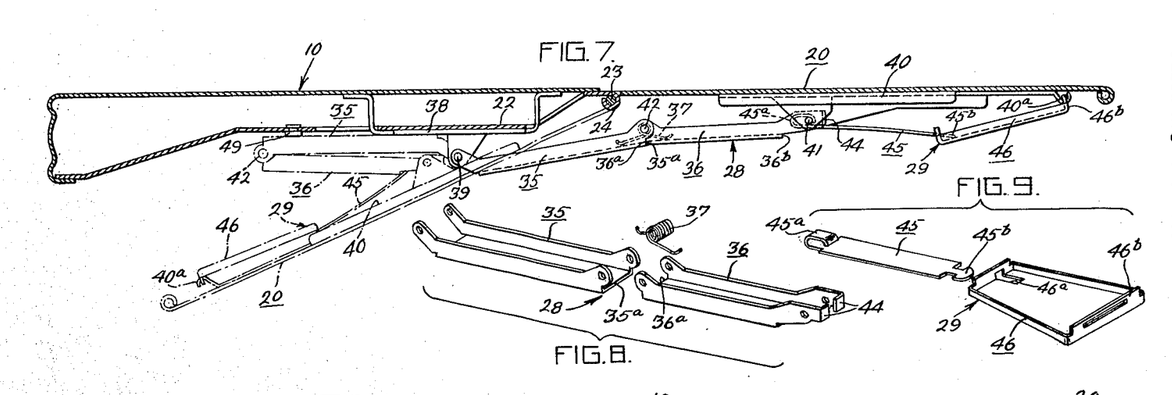
FIG. 7 is a view taken along line 7—7 of FIG. 1.
FIG. 8 is a perspective exploded view of the support structure shown in FIG. 7.
FIG. 9 is an exploded view of the release structure shown in FIG. 7.

Referring next to FIGS. 6–14, the support structure 28 and its relationship to the leaf 20 is shown in detail. As can be seen in FIG. 8, the support member consists of a pair of rigid members 35 and 36 and a light spring 37 having a force effect small compared to the torsion spring hinge pin 23 of hinge 24. Each of the rigid members 35 and 36 is here shown as a channel member having parallel ears extending the channel sidewalls at each end for receiving pins providing pivotal connection. The nature of arrangement of the pivot pin connections is best seen by reference to FIGS. 6 and 7. As can be seen in FIG. 6, one end of rigid member 35 is fixed to top 10, or more specifically through planar member 38. Planar member 38 is spot welded to deck 22 and its end tabs extending through holes in deck 22 are also welded to the actual table top. A pair of ears are punched from the piece 38 and folded parallel to one another to provide the attaching means to which pin 39 pivotally connects one end of rigid member 35 to top 10. Similarly, a shallow sheet metal channel 40 attached to the extension leaf is provided with ears punched from the channel to provide parallel portions to connect the rigid member 36 to extension leaf 20 by pin 41. Interconnecting the free ends of rigid members 35 and 36 is pin 42 which is preferably inserted within a spring 37. The spring is so arranged that, as seen in FIG. 7, the ends of the spring tend to urge the ends of rigid members 35 and 36 and pin 42 upwardly until opposing ends 35a and 36a of members 35 and 36 abut one another and provide stops to prevent further relative movement of the members. This is the position of the support member 28 as shown in FIG. 7. The ears which permit rigid member 36 to be attached to the extension leaf 20 extend beyond the pivotal connection and are terminated in inwardly extending tabs 44. These tabs 44 constitute part of the release mechanism, the balance of which is shown in FIG. 9.

The release mechanism is a flat spring 45 and an actuator lever 46. Spring 45 has a loop at one end formed by folding the flat spring member back on itself and this loop is arranged to engage the pin 41. The spring 45 is positioned to lie, as shown in FIG. 7, so that the tabs 44 lie between it and the extension leaf 20. The free end of spring 45 is then provided with a tab 45b consisting of a thin neck between the strip and an enlarged head providing shoulders between the neck and the head and the neck and the strip. The tab 45b is turned sidewise and slid into slot 46a in actuator member 46 and is positioned as shown in detail in FIG. 10. In tab 46b formed at right angles to the main plane of the actuator the actuator lever has a lateral slot which enables it to receive the hook portion 40a affixed to the extension. This hook portion is preferably part of channel member 40 as best seen in FIG. 6.

Figure 13:
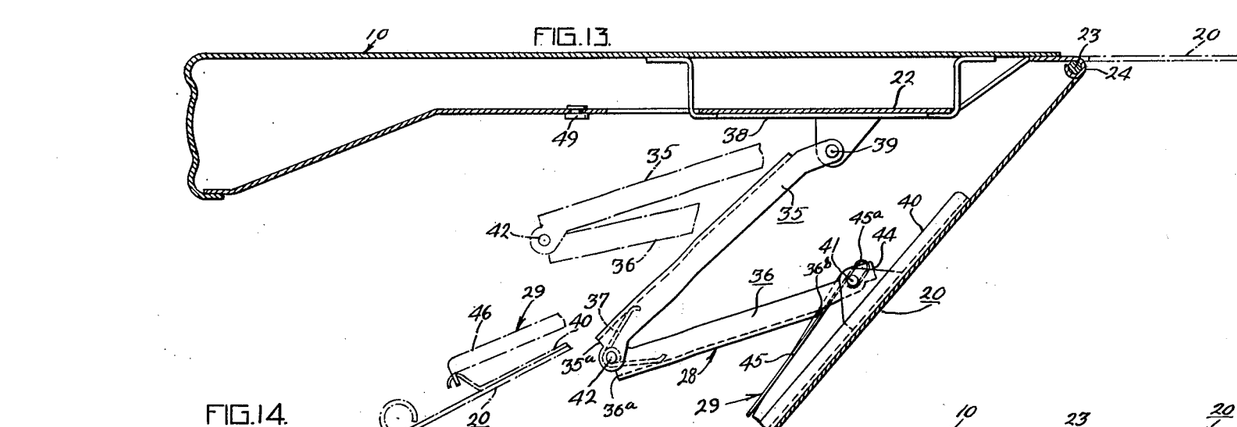
FIG. 13 is a sectional view similar to FIG. 10 showing the support structure as it is being collapsed to storage position but before it passes over-center to storage position.
Figure 14:
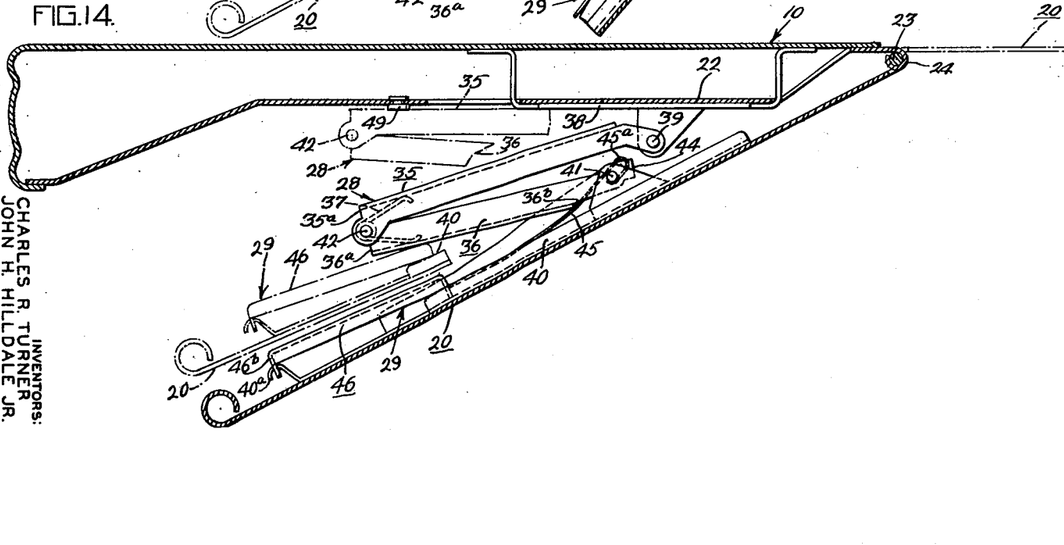
FIG. 14 is a view similar to FIG. 12 showing the support member just before it has passed over-center position.

The operation of the support member may best be understood by reference to FIGS. 7 and 8, 13 and 14. Referring to FIG. 7, it will be observed that when release lever 46 is pressed toward the extension leaf 20, it also urges spring member 45 in that direction and causes it to exert a force on the inwardly extending tabs 44 on rigid member 36, thereby tending to produce a counterclockwise movement around pin 41 as seen in FIG. 7. This movement is sufficient to cause pin 42 to cross a line between pins 41 and 39. Once past this position, the torsion spring 23 will cause the extension leaf 20 to fold to the position shown in FIGS. 11 and 12. The spring 37 being much lighter will be completely overcome and folding will progress as shown in FIGS. 13 and 14.

As can be seen in FIG. 13, spring 45 will begin to bear against the back edge 36b of the bottom of the channel of rigid member 36. The spring is relaxed in the position assumed by leaf spring 45 after actuating lever 46 has been pressed against the extension leaf 20. As can be seen in FIG. 14, as the V between members 35 and 36 further closes, the spring 45 is further stressed by virture of its abutment against edge 36b. In the position shown in full lines in FIG. 14, pin 42 is about to pass the line between pin 39 and hinge pin 23, and, as it passes over center in this manner, the stress stored in spring 45 will relieve itself by a rotation of the whole structure about pin 39 until the total support structure collapsed against itself moves flat against the underside of stiffening deck 22 and into bumper 49. This action is in aid of the effect of the torsion spring hinge 23 and tends to draw member 20 into the dashed line position shown in FIG. 14 or the full line position shown in FIGS. 11 and 12 by a snap action which relieves at least in part the stressing of spring 45. The arrangement of the rigid members 35 and 36 and their pin-engaging ears is a preferred design to permit maximum compactness in folding.

In order to extend the leaf 20 into the plane of the table top, it is manually pulled outward and upward thereby rotating about hinge 24 in opposition to its torsion spring hinge pin 23. As it approaches the plane of the table top, intermediate pin 42 passes through a line between pins 39 and 41, at which point spring 37 urges it on until shoulders 35a and 36a abut. The abutment of shoulders 35a and 36a renders the whole structure rigid. After pin 42 passes by and between pins 39 and 41, the action of torsion spring 23 tends to cause member 36 to move in a clockwise direction and member 35 to move in a counterclockwise direction about pin 42 in a collapsing V. This they cannot do because their shoulders abut and, therefore, the action of torsion spring 23 is to hold them more firmly together. In this way, solid support is provided for the extension leaf so that ironing can take place on the leaf as well as the table top 10 without collapse of the support structure 28.

Only by actuation of release lever 46 will the pin 42 pass back between pins 39 and 41 so that torsion spring 23 can cause extension leaf 20 to fold to the position shown in FIG. 11 in the manner previously described.

Considering now the support means 30 of leaf extension 21 with reference to FIGS. 3 and 4 will indicate that there are preferably two support members in view of the somewhat long and narrow nature of the leaf. These two members are spaced lengthwise of one another and preferably located at cross braces 50 which are ordinarily provided on an ironing table top structure to give the table top lateral rigidity. Instead of being connected directly between the table top 10 or even its support brace 50, connection in each case is made between a bracket 31 which is fixed to a support brace 50 and the remote side of the extension leaf 21. The bracket tends to lower the pivot point to a position where the brace is at an angle of about 30° with the top. Each of of the support members consists of two rigid members 52 and 53 of which member 52 is pivotally connected by pin 54 to bracket 31 beneath the table top. Member 53 is pivotally connected by portion 53a to the bottom of the remote side of the extension leaf 21. As best seen in FIG. 15, rigid member 53 is in fact formed of rod material which is bent to form a pivotal support 53a. The pivotal support portions 53a are held in place by tabs punched from a piece of sheet metal formed at right angles and fixed to the extension leaf 21 to conform to the edge portion 21b thereof. Rigid member 53 also provides the pin 53b which connects it to rigid member 52. As can be seen, member 52 is a somewhat short channel member provided with parallel side edges cut to receive rod 53b and a cooperating tab 52a which serves the dual function of holding rod 53b in place relative to the side flanges and holding V-shaped spring member 56 in place. Spring 56 is oriented as best seen in FIGS. 16 and 17 so that the vertex of the V lies beneath pin 54 and one arm of the V contacts member 52 while the other arm of the V contacts top edge strip 57 which is affixed beneath the edge of the top 10 and forms an integral part thereof.

Figure 16:
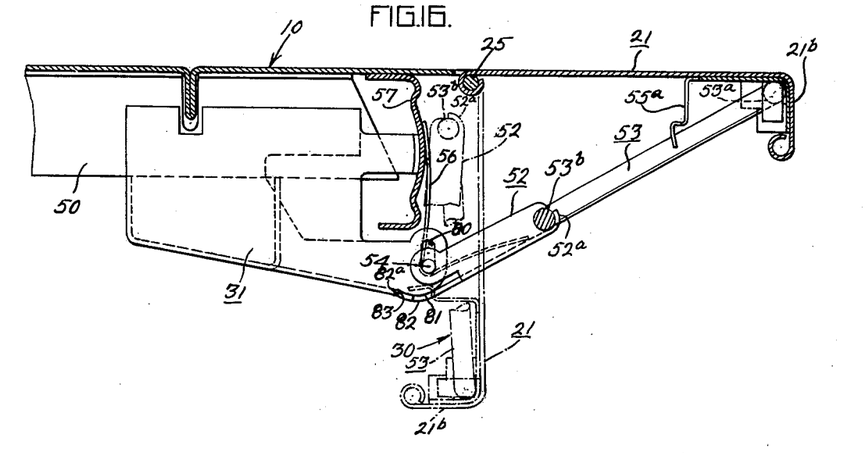
FIG. 16 is a sectional view taken on line 16—16 of FIG. 1.
Figures 17, 18:
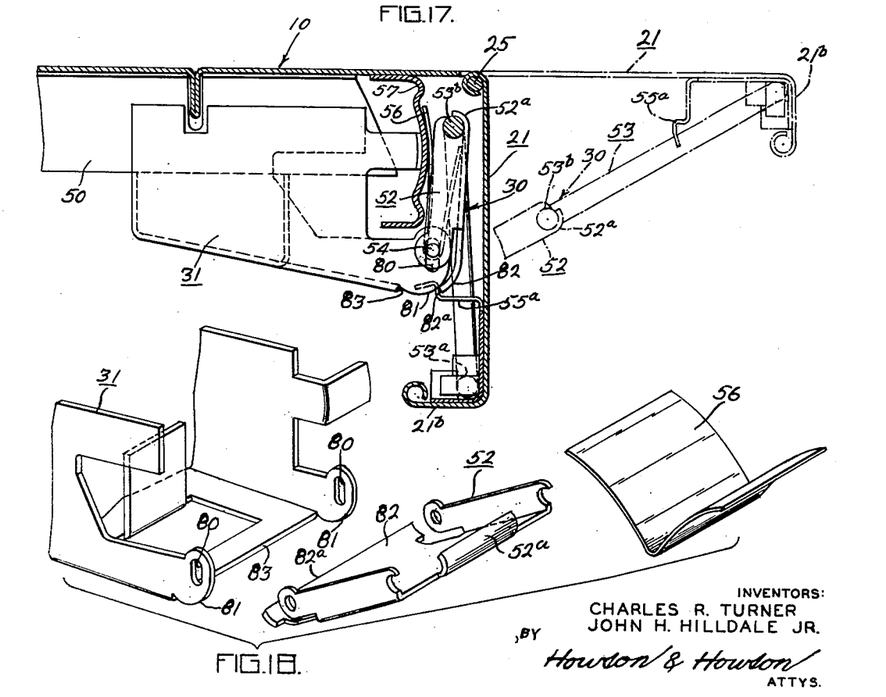
FIG. 17 is a sectional view similar to FIG. 16 but showing the leaf structure in lowered storage position.
FIG. 18 is an exploded perspective view of some of the support structure.

The spring 56 urges member 52 clockwise around pivot 54 as shown in FIGS. 16 and 17 and therefore urges the structure into supporting position shown in FIG. 16. The support bracket which holds pin 54 in a vertically elongated slot 80 is provided with a pair of camming surfaces 81 against which a cam follower 82 on rigid member 52 bears. The effect of this arrangement is to urge pin 54 to the bottom of the slot 80 as the support structure moves into the support position shown in FIG. 16 and thereby take up any play which might otherwise exist. Moreover bracket 31 provides a stop 83 against which edge 82a of cam follower 82 abuts. Thus these two regions provide a stop which limits movement of the rigid member 52. When these stops abut as shown in FIG. 16, rigid member 52 can move no further and therefore rigid rod member 53 will move no further. Preferably the pivot or pin portions 53b are located in this condition just past a line between pivots 53a and 54 so that forces applied to the extension of the table tend to cause pin 53b to move downwardly from the position of FIG. 17 which is impossible in view of the action of stop members 83 and 82a. A rigidly positioned extension leaf results.

As will be clear by reference to FIGS. 3 and 4, the release member 32 forms an integral part of rigid member 53 and is formed from part of the same rod structure. In fact both members 53 and the release member 32 are preferably one piece. Release member 32 is so arranged that it moves away from the extension leaf 21 as member 53 does in assuming its support position. Thus by pressing release member 32 upwardly toward extension leaf 21, the pivot 53b is moved back past the line between pivot points 53a and 54, and it becomes possible to collapse the leaf extension 21 by merely pressing downwardly to cause it to rotate about its hinge pin 25. The slots 60 allow the relative movement which must occur between the pivot points as extension member 21 is collapsed. In addition, the latch member 55a which is preferably an integral part of angle member 55 locks against the stop 82a of cam follower portion 82 of rigid member 52 thus giving further assurance that the structure will tend to stay in storage position.

In opening the extension leaf 21 to the extended position of FIG. 16, reverse procedure is followed. Tab 55a is resilient and presents a sloping surface to stop 82 so that it may be pulled free of such stop. As extension leaf 21 is raised about hinge pin 25 spring 56 urges rigid member 52 clockwise about pin 54 and the cam follower 82 rides along cam surfaces 81 until shoulder 82a abuts stop 83 on bracket 31. At this point, pivot 53b has passed over-center of pivots 53a and 54 and the extension leaf is in position ready for use.

From the above, it will be seen that the invention concerns an ironing table including an elongated table top and a supporting leg structure affixed to the top so constructed and arranged that it may be collapsed for storage against the top. It is characteristic of this structure that a leaf is provided for selectively extending the table top. Hinge means connects the extension leaf to the top along a straight line to permit rotational movement of the leaf relative to the top into and out of the plane of the top. Support means affixed to the top is constructed and arranged alternatively to support the leaf in the plane of the top and to allow the leaf to be rotated toward the underside of the table top to a storage position. The support means is preferably arranged so that merely by raising the leaf into the plane of the top, the support will be urged into an effective position to support the leaf in the plane of the top. Also preferably release means is provided whereby support means may be moved from its top supporting position to a position permitting rotation of the leaf out of the plane of the top. Preferably the support means includes a pair of rigid members one of which is pivoted at one end to the top and the other of which is pivoted to the extension leaf and the free ends of which are pivoted together. Spring means is provided and arranged to urge the rigid members past the position in which the pivots are aligned. Stop means is provided on at least one of the rigid members so positioned that it abuts another stop just past alignment of the three pivots and prevents further movement of the rigid members in the direction opposed by the stops. Of course, it will be clear to those skilled in the art that many modifications are possible within the scope of these broad limitations and all such modifications within the scope of the claims are intended to be within the scope and spirit of the present invention.

The present invention also relates to an ironing table top cover. According to common practice, a pad is placed over the entire ironing surface and secured by a cover maintained in taut position by elastic means. The pad and cover may, of course, be integral or they may be separate. The structure described above, and particularly the hinge structure thereof, presents a flush smooth surface which will not tend to pinch the pad and cover when either leaf extension is moved between stored and extended position. Thus, it is possible to provide a cover which has a completely smooth top following the contour of the table top with the leaves extended and capable of remaining smooth and taut on the table as the leaves are folded into stored position. For an understanding of the novel cover employed, reference is made to FIGS. 19–22 wherein the underside of the table is shown with the cover in place. The underside of the top is shown with the leg structure removed and with the top in place. In these figures the cover generally designated 60, the cover is so formed that it covers the ironing side of the table top and extends below the edges on all sides, extending further in some places as shown than in others. As shown, a pocket 61 is formed in one end of the cover and arranged to fit over the end of the table top that includes the leaf 20. This pocket is particularly deep at corner 61a. The pocket 61 is shallower at corner 61b to avoid interference with support structure 28 and release structure 29. A second pocket 62 encloses the tapered portion of leaf 21 and the cover is so arranged that a smooth contour or curve 63 will be presented. The portion between pocket 61 and specifically corner portion 61b and smooth contour portion 63 is essentially a straight line. Other regions at the edges of the table top present an essentially straight line and when the leaf 21 is lowered an essentially straight line at the edge of the entire length of the table top will be presented if leaf 20 remains raised.

Figure 19:
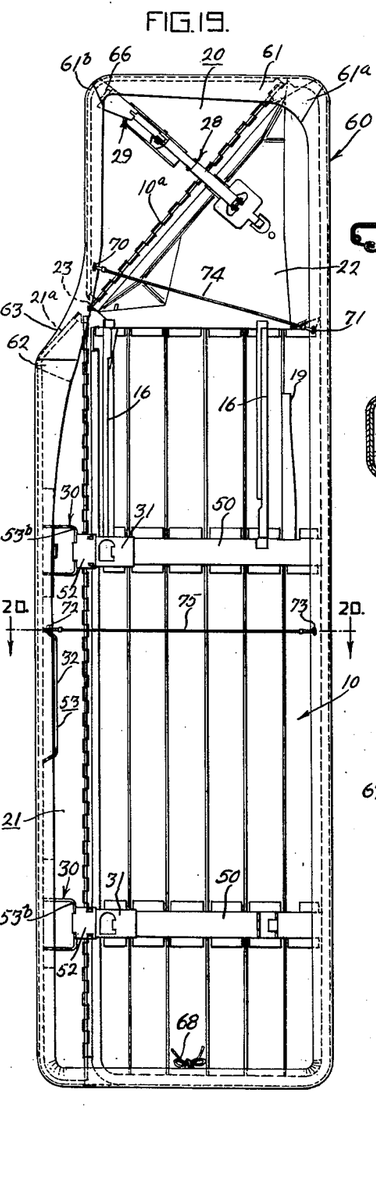
FIG. 19 is a view from below of the ironing table top structure with the legs removed showing a cover for the table top in place.
Figure 20:
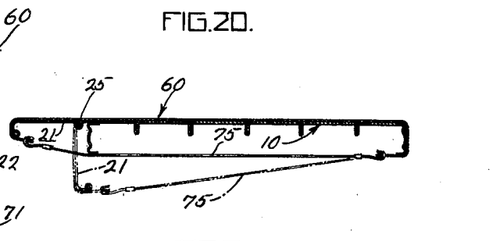
FIG. 20 is a sectional view along line 20—20 of FIG. 19.
Figure 21:
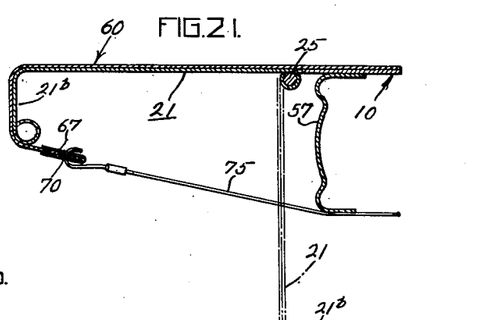
FIG. 21 is a detail view showing a portion of FIG. 20 enlarged.
Figure 22:
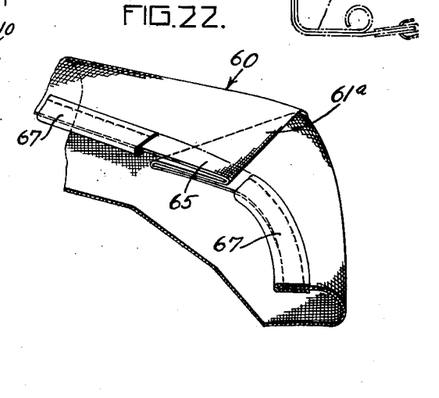
FIG. 22 is a detail view of one of the corners of the cover showing details of construction of the pocket.

The nature of the cover is such that folds must be taken at corners at 61b and 61a. The nature of the construction of the cover at corner 61a may be observed in the detailed view of FIG. 22 which shows triangular folds 65 which may be suitably stitched. A similar triangular fold 66 is provided at corner 61b. The peripheral edge is then bound by a suitable tape 67 which is sewn in place and encloses a draw string the ends of which may be exposed for tying at 68. By cutting the cover to provide pockets 61 and 62 and by making stitches as necessary, when the cover is tightened by the draw string, the bottom of the cover will appear as at FIG. 19. Eyelets 70, 71, 72 and 73 are provided at spaced intervals in opposing side edges of the cover as illustrated in FIG. 19. Between eyelets 70 and 71 extends an elastic member 74 and between eyelets 72 and 73 extends an elastic member 75. These elastic members 74 and 75 stretch across the underside of the table top to keep the cover in taut condition. Eyelet 70 is located adjacent the narrow portion of the board above curvature 63 and its opposing eyelet 71 is located preferably so that the distance from eyelet 71 to the end pocket 61 is greater than the distance from eyelet 70 to the same end pocket. This aids in the conformity of the cover in the region of curvature 63. With the cover constructed as shown, it remains smooth and taut regardless of the position of the leaves. As shown in FIGS. 20 and 21, elastic member 75 also tends to urge leaf 21 downward after release by actuator 32.

The cover shown and described is a preferred construction. Other cover constructions which may be conceived within the scope of the claims are intended to be within the scope and spirit of the present invention.

We claim:

1. In an ironing table, an elongated top supported by a pair of crossed legs pivotally connected to each other at a point intermediate their ends, a fixed pivot connection between said top and the upper end of one of said legs, a transverse member connected to the upper end of the other leg, retaining guide means on said top slidably supporting said member, said table top having generally parallel edges except at one end where at least one edge is tapered toward convergence with the other edge along a straight line intersecting said one edge closely adjacent the outer end of said guide means, a generally triangularly-shaped leaf for selectively extending the table top to provide an essentially straight edge, hinge means connecting said leaf to the top along the tapered edge to permit rotationable movement of the leaf relative to the top into and out of the plane of the top, support means affixed to the top and to the leaf for supporting said leaf in the plane of the top, manually operable means for releasing said support means, spring means adapted to rotate the leaf and fold it upward beneath the underside of the top, and resilient means to engage said support means and thereby retain the leaf in its folded position.

2. In an ironing table, an elongated top supported by a pair of crossed legs pivotally connected to each other at a point intermediate their ends, a fixed pivot connection between said top and the upper end of one of said legs, a transverse member connected to the upper end of the other leg, retaining guide means on said top slidably supporting said member, said table top having generally parallel edges except at one end where at least one edge is tapered toward convergence with the other edge along a straight line intersecting said one edge closely adjacent the outer end of said guide means, a generally triangularly-shaped leaf for selectively extending the table top to provide an eccentially straight edge, hinge means connecting said leaf to the top along the tapered edge to permit rotational movement of the leaf relative to the top into and out of the plane of the top, spring means urging the leaf out of the plane of the top, support means for said leaf comprising a pair of rigid members one of which is pivoted at one end to the top, the other of which is pivoted at one end to the leaf, and the free ends of which are pivoted together, light spring means between the rigid members arranged to urge the pivot connecting the rigid members past the position in which the three pivots are brought into alignment, opposing stops on each of the rigid members so positioned that they abut each other just past alignment of the pivots and prevent further movement of the rigid members in the direction opposed by the stops whereby the rigid members act together as a rigid unit to support the leaf in the plane of the table top when the stops are in abutment, and release means for moving the pivot connecting said rigid members overcenter against the bias of said light spring so that the stops are no longer in abument whereby said leaf may be folded under the table top, said release means consisting of lever means acting on an extension of the rigid member pivoted to the leaf, which extension extends from the opposite side of the supporting pivot on the leaf from the general extent of the rigid member.

3. The ironing table of claim 2 in which the release means includes a flat spring pivoted to the same pivot which supports the rigid member on the leaf arranged to engage said extension of the rigid member and extending beyond the point of engagement therewith, and an operating member pivoted at one end to the flat spring at its free end and at the other end to the leaf.

4. The ironing table of claim 3, in which said rigid member is provided with a transverse surface adjacent its pivotal connection to the leaf, arranged to be engaged by said flat spring as the leaf is folded down and under the table top, whereby the pivot connecting the rigid members to each other is moved overcenter of a line through the pivot connecting the rigid member to the top and the hinge between the leaf and the top.

5. An ironing table in accordance with claim 1, including a hinged longitudinal section comprising a second leaf extending from the line of separation between the triangular leaf and the table top to the remote end of said top, means for supporting said second leaf in the plane of the table top, and manually operable means for releasing said support means.

6. An ironing table in accordance with claim 5, wherein one end of said second leaf is shaped at an angle coinciding with the angle representing the line of separation between the triangular leaf and the table top, whereby it forms an extension of the tapered end of the top.

7. The ironing table of claim 5 in which the support member for the second leaf includes at least a pair of rigid members one of which is pivoted at one to the top, the other of which is pivoted at one end to the extension leaf, and the free ends of which are pivoted together, spring means between the top and the rigid member pivoted to the top arranged to urge the rigid members into and past the position in which the pivots are aligned thereby raising the leaf into the plane of the top, and opposing stops between at least one pair of the relatively movable members so positioned that they abut just past alignment of the three pivots and prevent further movement of the rigid members in the direction opposed by the stops and that the rigid members act together as a unit to support the leaf in the plane of the table top when the stops are in abutment.

8. The ironing table of claim 7 in which the pivot point of the rigid member attached to the top is spaced well below the plane of the ironing surface of the top into which the leaf is movable and a spring member acts between the top structure and the rigid member attached to it to urge them apart.

9. The ironing table of claim 8 in which there are two supporting members spaced laterally of one another along the hinge such that the members pivoted to the extension leaf are connected by a common member which includes an actuator enabling the pivot points to be moved back past the alignment position so that the leaf can be rotated out of the plane of the top.

10. The ironing table of claim 8 in which stop means is provided on the ironing table and the rigid member pivoted thereto which limit the movement of said rigid member relative thereto.

11. The ironing table of claim 8 including a support bracket affixed to the table top, the pivot pin between one rigid member and the top being mounted in a vertically oriented slot in said support bracket, and camming means arranged to urge the pivot pin toward the bottom of said slot as the leaf is moved into the plane of the table top.

References Cited in the file of this patent

UNITED STATES PATENTS

| | | |
|---|---|---|
| 131,478 | Tice | Sept. 17, 1872 |
| 235,403 | Baldwin | Dec. 14, 1880 |
| 1,473,359 | Schumacher | Nov. 6, 1923 |
| 1,844,128 | La Chappelle | Feb. 9, 1932 |
| 2,269,804 | Allaback | Jan. 13, 1942 |
| 2,284,003 | Luppert | May 26, 1942 |
| 2,316,447 | McFall | Apr. 13, 1943 |
| 2,729,005 | Foster | Jan. 3, 1956 |
| 2,896,347 | Hortman | July 28, 1959 |
| 2,954,619 | Foster | Oct. 4, 1960 |
| 2,999,325 | Munson et al. | Sept. 12, 1961 |
| 3,021,628 | Di Cillo | Feb. 20, 1962 |

UNITED STATES PATENT OFFICE
CERTIFICATE OF CORRECTION

Patent No. 3,143,086                              August 4, 1964

Charles R. Turner et al.

It is hereby certified that error appears in the above numbered patent requiring correction and that the said Letters Patent should read as corrected below.

Column 9, line 7, for "eccentially" read -- essentially --; column 10, line 6, after "one" insert -- end --.

Signed and sealed this 1st day of December 1964.

(SEAL)
Attest:

ERNEST W. SWIDER                              EDWARD J. BRENNER
Attesting Officer                                   Commissioner of Patents